United States Patent [19]
King et al.

[11] Patent Number: 5,868,581
[45] Date of Patent: Feb. 9, 1999

[54] DOCUMENT INTERPRETING SYSTEMS

[75] Inventors: Reginald Alfred King, Shrivenham; Hrand Mami Mamigonians, London, both of United Kingdom

[73] Assignee: Scanna Technology Limited, London, England

[21] Appl. No.: 635,936

[22] PCT Filed: Oct. 26, 1994

[86] PCT No.: PCT/GB94/02356

§ 371 Date: Jul. 9, 1996

§ 102(e) Date: Jul. 9, 1996

[87] PCT Pub. No.: WO95/12187

PCT Pub. Date: May 4, 1995

[30]  Foreign Application Priority Data

Oct. 26, 1993 [GB] United Kingdom .................... 9322042

[51] Int. Cl.⁶ ..................................................... G09B 5/00
[52] U.S. Cl. ......................... 434/317; 434/169; 434/185; 200/5 A; 200/512; 462/55; 281/15.1
[58] Field of Search .................................... 434/156–159, 434/169, 178, 185, 201, 259, 307 R, 308, 317, 322–327, 334, 337, 339, 350, 362, 365; 341/34; 345/173, 174, 179; 178/18, 19; 200/5 A, 512; 462/17, 55; 273/236–239, 272; 84/470 R, 483.1, 678; 281/15.1

[56]  References Cited

U.S. PATENT DOCUMENTS

| | | | |
|---|---|---|---|
| 3,376,778 | 4/1968 | Musser | 84/483.1 |
| 3,522,665 | 8/1970 | Kalt | 434/317 X |
| 3,562,394 | 2/1971 | Kiepe | 84/470 R X |
| 4,448,837 | 5/1984 | Ukeda et al. | |
| 4,664,634 | 5/1987 | Cutler et al. | |
| 4,697,048 | 9/1987 | Clements et al. | |
| 4,802,092 | 1/1989 | Harte | |
| 4,809,246 | 2/1989 | Jeng | |

(List continued on next page.)

FOREIGN PATENT DOCUMENTS

| | | |
|---|---|---|
| 0 383 304 | 8/1990 | European Pat. Off. . |
| 2115587 | 9/1983 | United Kingdom . |
| 2132359 | 7/1984 | United Kingdom . |
| WO84/02995 | 8/1984 | WIPO . |
| WO87/06752 | 11/1987 | WIPO . |
| WO90/15402 | 12/1990 | WIPO . |
| WO91/07715 | 5/1991 | WIPO . |
| WO92/18964 | 10/1992 | WIPO . |
| WO93/17764 | 9/1993 | WIPO . |

OTHER PUBLICATIONS

Davis, M.R. et al, "The Rand Tablet: A Man–Machine Graphical Communication Device", Fall Joint Computer Conference, 1964 pp. 325–331.

Teixeira, J.F., et al, "The Sylvania data tablet: A new approach to graphic data input", Spring Joint Computer Conference, 1968, pp. 315–321.

Brenner, A.E. et al, "A Sonic Pen: A Digital Stylus System", IEEE Transactions on Computers, Jun. 1970, pp. 546–548.

Newman, W. et al, "Principles of Interactive Computer Graphics", McGraw–Hill Book Company, pp. 177–180 and 447.

Stavely, D.J., "A High–Quality, Low–Cost Graphics Tablet", Hewlett–Packard Journal, Jan. 1981, pp. 15–23.

Mamigonians, H.M., "Man–Machine Interface Systems for Industrial Robots", Ph.D. thesis, University College London, Jun. 1981, pp. 82–109, 288–298 and 300–301.

*Primary Examiner*—Joe H. Cheng
*Attorney, Agent, or Firm*—Jacobson, Price, Holman & Stern, PLLC

[57]  ABSTRACT

A document interpreting system comprises a book having the co-ordinate array of a graphics tablet embodied in it, conveniently in the front cover and rear cover thereof, an electronics module comprising a microcontroller connected to the co-ordinate array, a pointer for pointing to arbitrary areas on an open page of the book, and a speech circuit for causing speech or other sounds to be emitted corresponding to the area of the page which is being pointed to.

10 Claims, 5 Drawing Sheets

U.S. PATENT DOCUMENTS

| | | | |
|---|---|---|---|
| 4,818,827 | 4/1989 | Ipcinski et al. | 200/5 A |
| 4,884,974 | 12/1989 | DeSmet . | |
| 5,087,043 | 2/1992 | Billings et al. . | |
| 5,088,928 | 2/1992 | Chan | 434/339 |
| 5,191,329 | 3/1993 | Samreus . | |
| 5,466,158 | 11/1995 | Smith, III | 434/317 |
| 5,575,659 | 11/1996 | King et al. . | |
| 5,636,995 | 6/1997 | Sharpe, III et al. | 434/169 X |

DOCUMENT INTERPRETING SYSTEMS

This invention relates to document interpreting systems and is especially applicable to such systems for assisting learning of reading or pronunciation or understanding of words, phrases or sentences or interpretation of drawings, pictures, music, etc. It should be understood that the term "document" covers any printed matter or indeed any written or drawn matter, and in particular includes books.

In International Patent Application No. PCT/GB92/00302 (Publication No. WO92/15077) there is disclosed and claimed a document interpreting system comprising detecting means on which a plurality of documents to be interpreted which are not prepared specifically for use with said system may be stacked and for detecting through said documents the location of pointing means associated with said location detecting means and directed at any arbitrary area of the topmost document of said stack, speech storage means for storing speech relating to arbitrarily different areas of said documents, and speech reproduction means for reproducing speech stored in said speech storage means corresponding to the area of said topmost document to which said pointing means is directed.

In such a system it is to be noted that:

a. The documents or books to be used do not need to be produced specifically for the system.

b. The pointing means operates through many sheets/pages of the document or book.

c. The location detecting means is based on the use of a graphics tablet and co-ordinate location techniques which are used to identify the location of the pointing means.

d. The pointing means may be connected by wire or by radio, IR, sonic, or another non-physical means.

In the aforesaid International application the graphics tablet is fixed to a reading stand or desk and on which is positioned the book or documents to be interpreted.

Many different types of graphics tablets or digitisers, as they are sometimes referred to, are known and typical examples are disclosed in the following references:

1. Davis M. R., Ellis T. O. "The Rand Tablet, a man-machine graphical communication device", Fall Joint Computer Conference (FJCC), 1964, Spartan Books, Baltimore, Md, 325.
2. Teixeira J. F., Sallen R. P. "The Sylvania Tablet: a new approach to graphic data input", SJCC 1968, Thompson Books, Washington, D.C.315.
3. Brennar A. E., de Bruyne P. "A Sonic pen, a digital stylus system", IEEE, EC—19, 6, Jun. 1970, p 546.
4. Science Accessories Corporation "Graf/pen sonic digitizer" Science Accessories Corporation, Southporth, Conn., 1970.
5. Newman W. M., Sproul R. F. "Principle of Interactive Computer Graphics", McGraw-Hill, Kogakusha Ltd., 1973, pp 177–178.
6. Hewlett-Packard "Hewlett-Packard Journal"January 1981, pp 15–20.
7. Mamigonians H. M. "Man-Machine Interface Systems for Industrial Robots, Ph.D. thesis, University College London, June 1981, pp 82–109, 288–298 and 300–301.

Existing graphics tablets and digitisers such as, for example, the Rand Tablet (1), the Sylvania Tablet (2), the Acoustic Tablet (3,4), the voltage gradient Tablet (5), and others (6), are complicated, expensive and rigidly constructed, using high resolution grids.

The graphics tablet disclosed by Mamigonians (reference 7) utilises a simple printed circuit platern construction with a relatively coarse grid of relatively wide spaced horizontal and vertical conductors on both sides of an insulating material e.g. a double sided Printed Circuit Board (PCB), which method produces very high resolution and linearity.

It has now been discovered that such co-ordinate locating means may advantageously be arranged very cheaply in a very thin, near two dimensional form, which provides an advantageous arrangement for implementing the features of electronic book reading as disclosed in the aforesaid International Patent Application No. PCT/GB92/00302. It has been discovered that such co-ordinate locating means may be printed, or formed, using electrically conducting inks and other conducting materials, on paper, plastic or any other thin non-conducting material and may be embodied in the cover or loose cover of a book. Such an arrangement will enable electronic book reading systems to dispense with cumbersome separate; rigid, expensive graphics tablets and to provide electronic book reading very cheaply to a worldwide mass market of users.

Accordingly, in accordance with a first aspect of the present invention there is provided a document interpreting system comprising a book having a cover and a plurality of printed pages, a graphics tablet including a co-ordinate array of conductors formed as part of said book, processing means to which said co-ordinate array is connected, speech storage means responsive to said processing means for storing speech relating to different areas of the pages of said book, and speech reproduction means for reproducing speech stored in said speech storage means, characterised in that said co-ordinate array of conductors is formed as an integral part of said cover, and by an electronic pointer connected to said processing means for pointing to different areas of the pages of said book when said book is open, said electronic pointer being operable in conjunction with said co-ordinate array for detecting through said pages the area of the open book to which said electronic pointer is directed for causing the speech reproduction means to reproduce speech corresponding to the area of the open page of said book to which said electronic pointer is directed.

The features of the pre-characterising part of claim 1 set out above are disclosed in WO93/17764. However, this document relies upon detecting the area of an open page of a book to which a finger is directed using capacitive effects which is notoriously difficult to do in practice and does not allow precise areas to be defined which would enable separate words or letters of a book to be pointed at for the purpose of electronic reading. Also, although this document discloses the use in the page of a book of a sensor comprising rows and columns of conductive tracks, there is no disclosure of the use of such a sensor in the actual cover of a book, and furthermore the document leads the reader away from the use of such sensors in a book by stating that " . . . one possible disadvantage of a sensor of this type is that a very large number of connections have to be made between the ends of the conductive rows and columns and the micro-processor"—see the first paragraph on page 14.

In U.S. Pat. No. 4,802,092 there is disclosed an instructional apparatus which incorporates an electric probe which operates in conjunction with two sets of conductive strips to locate the point where the probe is placed on an instructional sheet placed over the conductive strips, but there is no disclosure of the instructional sheet or the conductive strips being formed as part of a book adapted to be read electronically.

In carrying out the invention in accordance with the said first aspect of the present invention, it may be arranged that said co-ordinate array is formed as an integral part of a fixed cover of said book, or as an integral part of a loose (e.g. dust) cover of said book.

In carrying out the invention said co-ordinate array may be provided with connector means for connecting said array to said processing means.

In a preferred arrangement in accordance with the said first aspect of the invention the co-ordinate array is formed as an integral part of the front cover and back cover of said book, in which case it may be arranged that said co-ordinate array comprises a plurality of spaced apart first conductors which extend generally across the width of both the front and back covers of said book, and a plurality of spaced apart second conductors which extend generally from top to bottom of the front and back covers of said book.

Advantageously, some of the second conductors of said front cover are connected to corresponding second conductors of said back cover for connector minimisation purposes.

It may be arranged that said first and second conductors are provided on opposite sides of a flexible non-conductive sheet which is embodied into the cover of said book.

The connector means may conveniently comprise a tape connector which may be adhesively attached to terminal portions of said first and second conductors.

The pointer may be connected to said processing means by wire, or may be remotely connected to said processing means, e.g. by radio, infra-red, sonic or other non-physical means.

In accordance with a second aspect of the present invention there is provided a book, for use in a system according to said first aspect of the present invention, having a cover and a plurality of printed pages, and a graphics tablet including a co-ordinate array of conductors formed as a part of said book.

An exemplary embodiment of the invention will now be described, reference being made to the accompanying drawings, in which.

Figure 1:
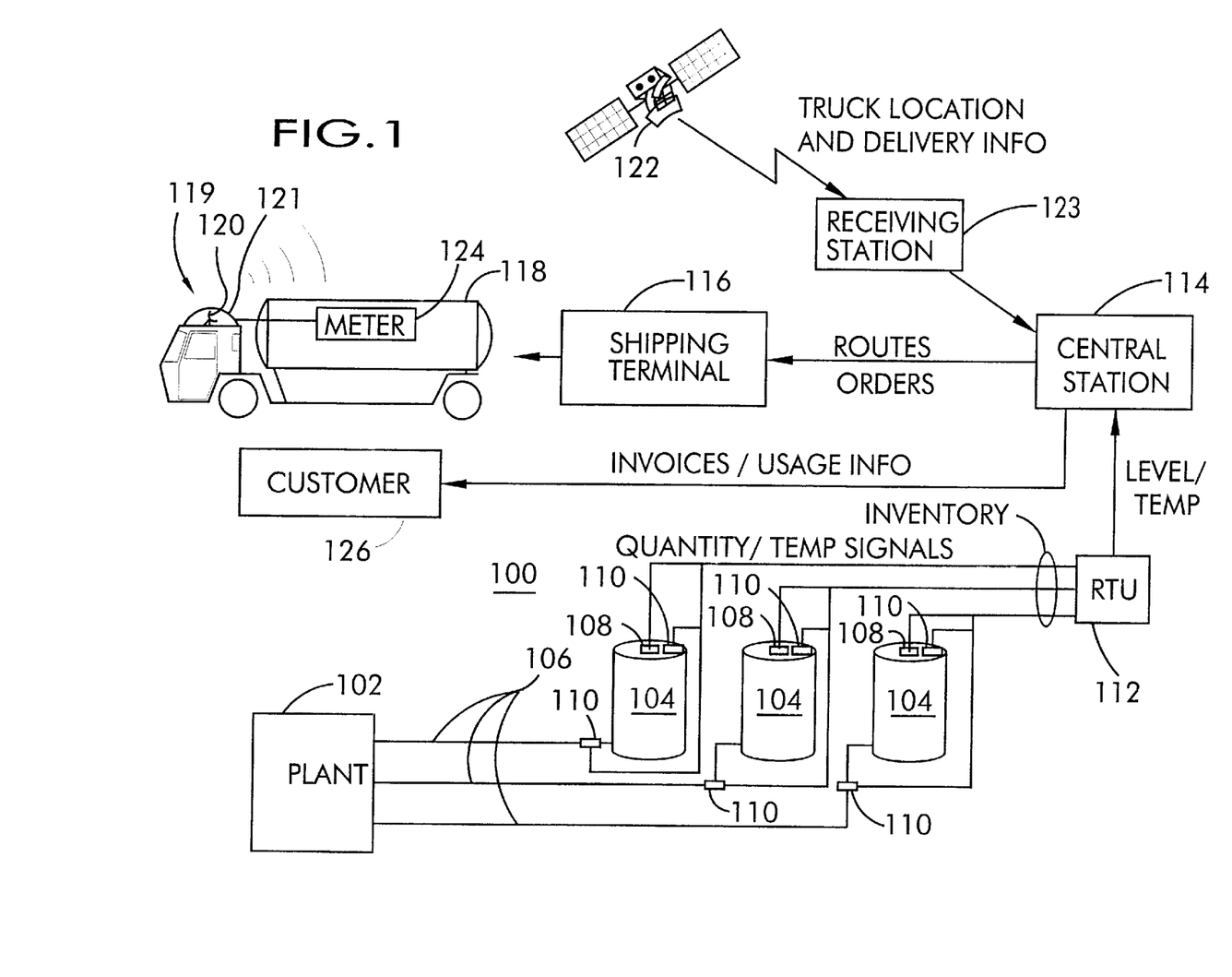
FIG. 1 is a diagrammatic view of a document interpreting system in accordance with the present invention depicting a book the inside face of the front cover of which is removed to reveal part of the co-ordinate array of a graphics tablet which is embodied in the front and back covers of the book.

The document interpreting system shown in FIG. 1 of the drawings comprises a book 1, which may take any convenient form, having the co-ordinate array 2 of a graphics tablet embodied in the front and rear covers thereof. Typically, the co-ordinate array 2 will be formed of a series of vertical and horizontal conductors, printed or otherwise formed on opposite sides of a flexible sheet, e.g. of plastics material, and is attached to the inside surfaces of the front and back covers and across the binding area of the book before the inside facings of the front and back covers are applied. In the book depicted in FIG. 1, the inside facing of the front cover 3 of the book 1 has been removed to reveal that part of the co-ordinate array 2 attached to the front cover 3. The co-ordinate array 2 extends across the binding area 4 of the book 1 to the rear cover 5 where it is covered by the inside facing 6 applied thereto. The book 1 of FIG. 1 is provided with a plurality of printed pages 7 which may typically include alphanumeric text and/or pictures which are to be interpreted by the document interpreting system.

The co-ordinate array 2 embodied in the front cover 3 and rear cover 5 of the book 1 of FIG. 1, is provided with connecting terminals 8 and 9 extending from the top edge 10 of the book 1, by means of which the vertical and horizontal conductors, respectively, are coupled to an electronics module 11. The electronics module 11 is provided with a pointer 12, which is connected to it by a flexible cable 13, by means of which a user may point to arbitrarily located words, phrases, pictures, etc., on the printed pages 7 of the book 1. The electronics module 11 detects the position on any page which is being pointed at by the pointer 12 and produces speech or other sounds associated with the words, phrases, picture, etc., which are being pointed to.

Because the co-ordinate array 2 extends across both the front cover 3 and rear cover 5 of the book 1, both sides of each of the printed pages 7 may be interpreted and it is arranged that the pointer 12 is operable through any number of pages 7 of the book 1.

Figure 2:
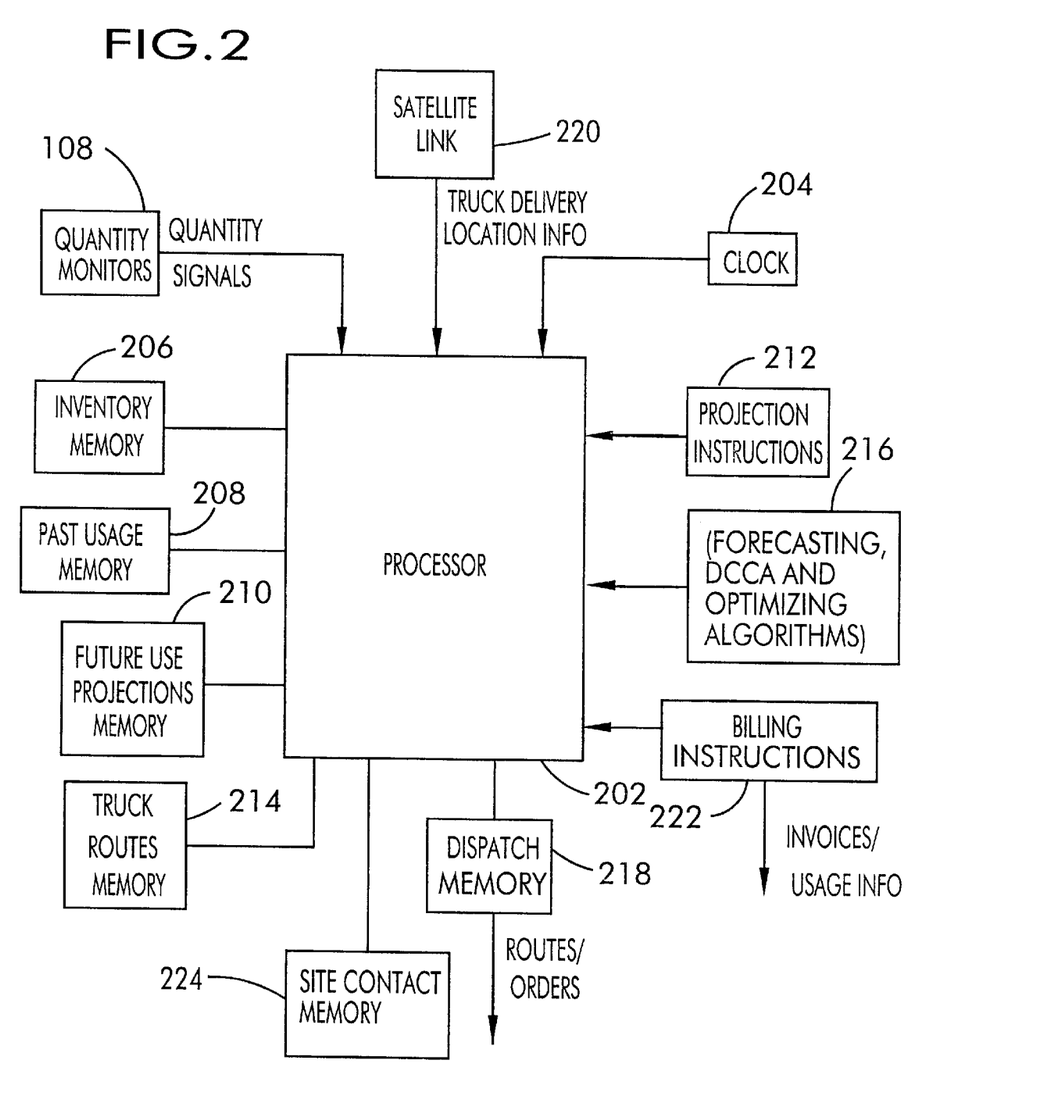
FIG. 2 is a block schematic view of the electronics module included in the system of FIG. 1.

The electronics module 11 of FIG. 1 is depicted in greater detail in FIG. 2. The electronics module 11 of FIG. 2 comprises a micro-controller which has an input 21 to which is connected the cable 13 of the pointer 12. The micro-controller 20 has outputs 22 and 23 to electrical connectors 24 and 25 respectively, which correspond to the connecting terminals 8 and 9 respectively on the book 1 and by means of which the micro-controller 20 is connected to the vertical and horizontal conductors respectively of the co-ordinate array 2 of the book 1 of FIG. 1. Power supply for the electronics module 11 is provided by an on-board battery 26.

Typically each of the vertical and horizontal conductors of the co-ordinate array 2 are pulsed in turn. When the pointer 12, which conveniently includes a mechanically operated switch embodied in the nose thereof, is directed at a position on an open page of the book 1, the switch of the pointer 12 will close and will feed the pulses corresponding to the vertical and horizontal conductors nearest to the position of the pointer 12 to the micro-controller 20. In this way the area of the page 7 of the book 1 to which the pointer 12 is directed is determined by the micro-controller 20.

When the area of a page 7 of the book 1 has been determined, an output is afforded to a speech circuit 27 which includes a memory, in the form of a look-up table or some other convenient form, which stores speech or other sounds corresponding to the various printed matter contained on the pages 7 of the book 1. The signal applied to the speech circuit 27 causes the speech or other sound which corresponds to the area of the page 7 to which the pointer 12 is directed to be emitted via a speaker 28.

In this way the pointer 12 may be directed to any area on any of the pages 7 of the book 1, and the electronics module 11 will cause speech or other sounds to be emitted corresponding to that particular area.

It will be appreciated that by embodying the co-ordinate array of a graphics tablet in an actual printed book at the time the book is fabricated, separate, cumbersome, rigid, expensive graphics tablets known to date may be dispensed with and enables electronic book reading to be provided very cheaply and efficiently.

The electronics module 11 of FIG. 2 is also provided with an input/output connection 29 to the micro-controller 20 by means of which it may be interfaced directly to external speakers, hi-fi and/or multi-media systems to facilitate interactive reading and other systems as required.

Figure 3:
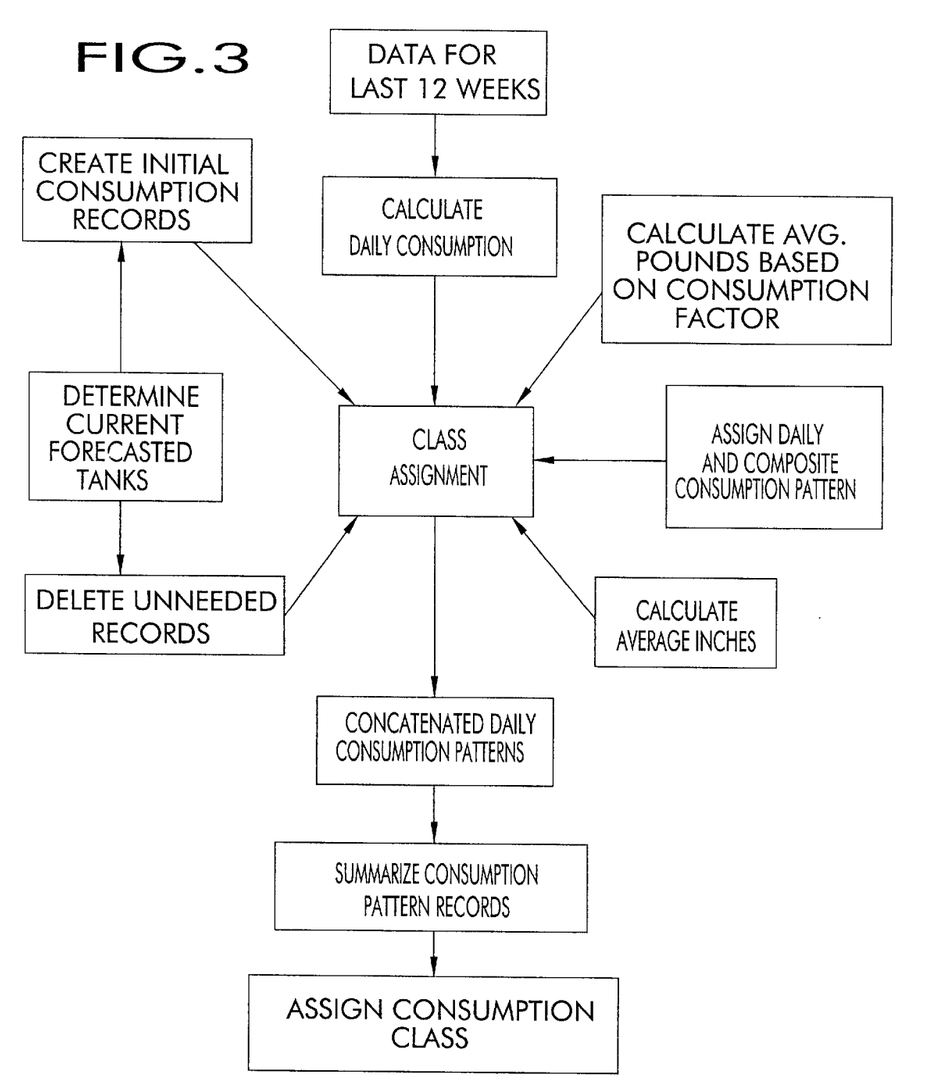
FIG. 3 is a view of the co-ordinate array embodied in the book of FIG. 1.

In the system described with reference to FIG. 1, the book 1 has the coordinate array 2 embodied in both the back cover 5 and front cover 3 thereof. One problem with such a system is that many electrical connections require to be made between the co-ordinate array 2 and the electronics module 11, via the connecting terminals 8 and 9. In FIG. 3 of the drawings there is depicted an advantageous form of co-ordinate array 2 which enables the number of connecting terminals required to be substantially reduced.

The co-ordinate array 2 shown in FIG. 3 comprises an array of vertical conductors 30 coupled to connecting terminals 8, and an array of horizontal conductors 31 coupled to the connecting terminals 9. The vertical conductors 30 and the horizontal conductors 31 are provided on opposite sides of an insulating sheet 33, e.g. of plastics material. For explanatory purposes the array of vertical conductors 30 of FIG. 3 is depicted in FIG. 4, and the array of horizontal conductors 31 of FIG. 3 is depicted in FIG. 5.

Figure 5:
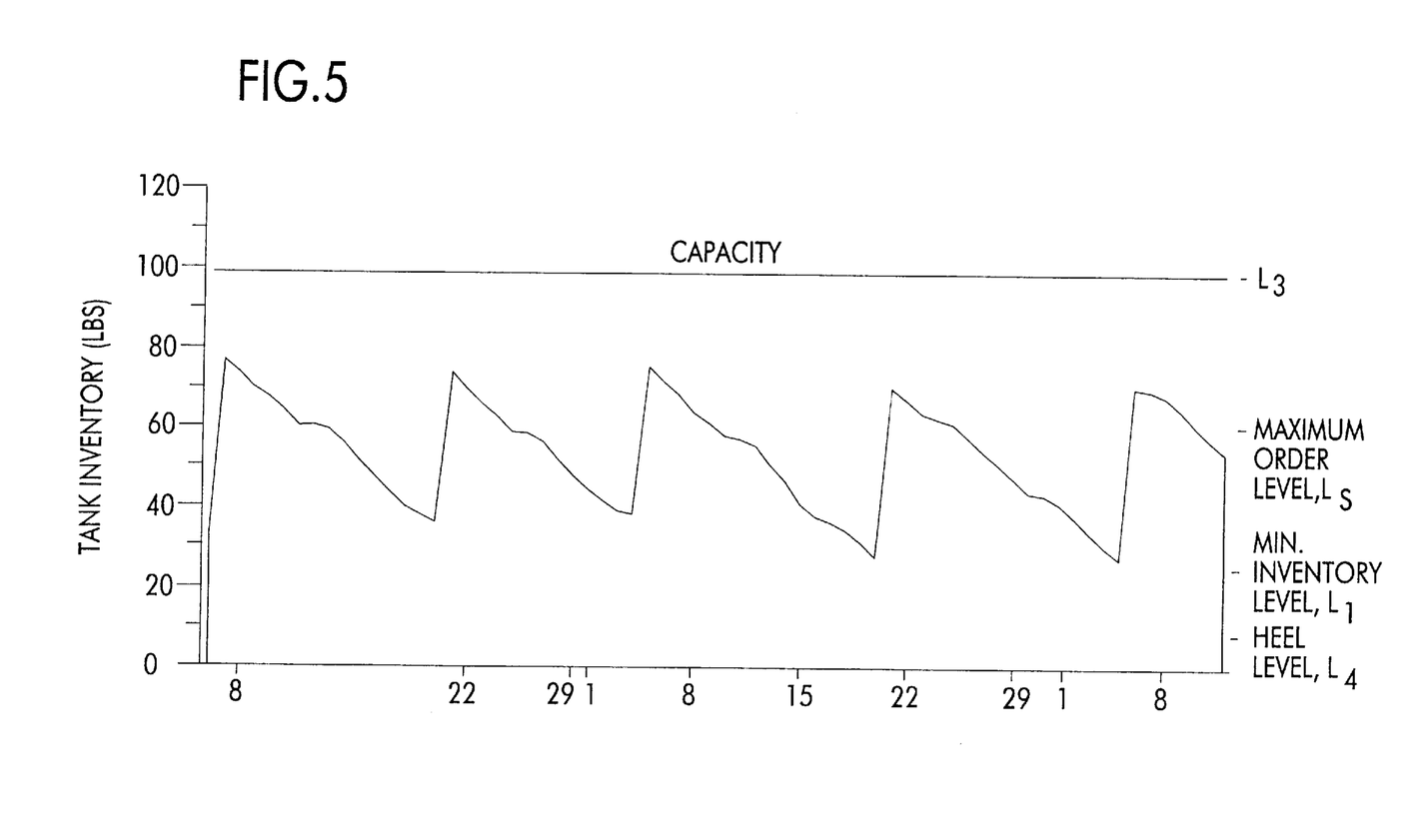

As will be seen from FIG. 5, the array of horizontal conductors 31 consists of fourteen individual conductors, alternate ones of which are coupled from the left side edge thereof to the connecting terminals 9 via connecting lines 34, and the others of which are coupled from the right side edge thereof to the connecting terminals 9 via connecting lines 35.

Figure 4:
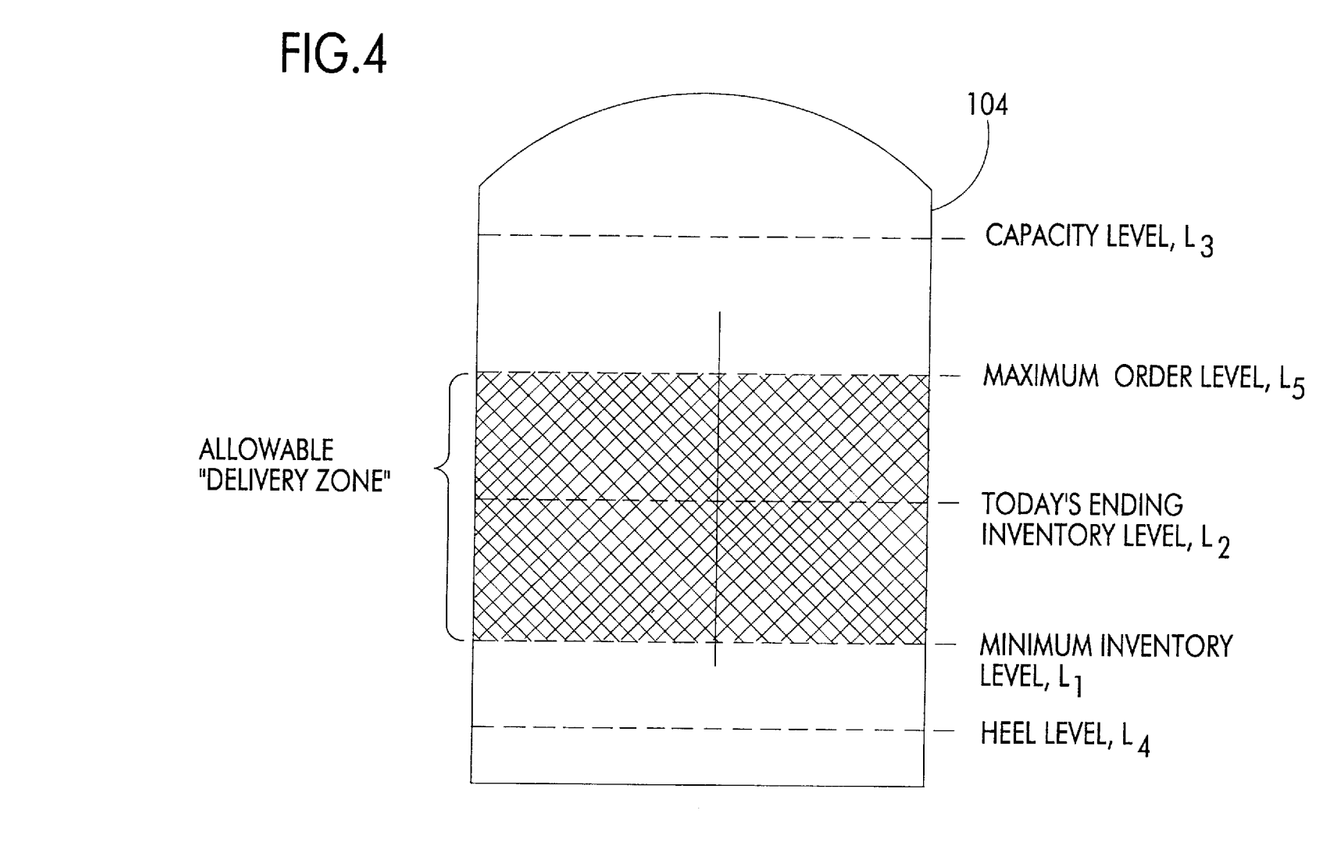
FIGS. 4 and 5 depict separately the vertical and horizontal conductors respectively of the co-ordinate array of FIG. 3.

As will be seen from FIG. 4, the array of vertical conductors 30 consists of two groups 36 and 37 of conductors 30, each group consisting of seventeen individual conductors, the group of conductors 36 being associated with the front cover 3 of the book 1 (FIG. 1) and the group of conductors 37 being associated with the back cover 5 of the book 1 (FIG. 1). Normally such an array of conductors would require thirty-four electrical terminations 8 which is excessive both as regards size and cost. In order to reduce the number of electrical terminations required, the outer two conductors 38 of each of the groups 36 and 37 are connected directly to the connecting terminals 8. Each of the remaining vertical conductors 30 of group 37 are connected directly to the connecting terminals 8 at their top ends, but their bottom ends are connected to the bottom end of the corresponding conductor in group 36. Thus the innermost conductor 39 of group 37 is connected to the innermost conductor 40 of group 36, etc. In this way, the number of connecting terminals 8 is reduced from thirty-four to nineteen. This reduction is achieved by making use of the outer two conductors 38 of each of the groups 36 and 37 to indicate whether a left side page or right side page is being interpreted. Thus, before pointing to an area to be interpreted, the pointer 12 of FIG. 1 is pointed to an area in the vicinity of the outer conductors 38 of the page in question and this affords an indication to the micro-controller 20 (FIG. 2) whether it is the left side page or right side page of the book 1 which is being interpreted.

In addition to providing an indication as to whether the left side page or right side page is being interpreted, the areas in the vicinity of the outer vertical conductors 38 can be sub-divided vertically and used to determine the actual number of the page being interpreted. Thus each page of the book 1 may be provided with an area in the vicinity of the conductors 38 which is indicative of the page number. These areas may be printed on the pages of the book or stickers or other indicia may be applied using a template by users of the system.

It will be appreciated that the embodiment of the invention which has been described has been given by way of example only and may be adapted to suit any particular application. For example, although the co-ordinate array 2 of the book 1 is provided embodied in both the front cover 3 and back cover 4 of the book, it may in some cases, e.g. where pages are only printed on one side, be embodied in either the front cover 3 or back cover 5. It is also envisaged that instead of being embodied in the actual cover of a book, the co-ordinate array could be embodied in a separate dust cover, or in one or more pages of the book e.g. the first and/or last pages of the book. The book may be of any convenient size or shape.

Also the electronics module 11 of FIG. 2 may take any convenient form, such as that disclosed in the aforesaid International application.

It is also envisaged that books incorporating a co-ordinate array may be produced and sold separately from the electronics module 11, in which case the connecting terminals 8 and 9 may be omitted initially, and provided subsequently if required using a pressure bar method, or using adhesively attached tape electrode connectors, such as those provided by 3M company.

The pointer 12 may take any convenient form and instead of being connected to the electronics module 11 by cable 13, may be remotely connected, e.g. by radio, infra-red, sonic or other non-physical means.

The co-ordinate array 2, instead of being formed on opposite sides of a flexible non-conducting sheet, may be formed on one side with insulation being provided at the conductor crossover points.

We claim:

1. A document interpreting system comprising a book (1) having a cover (3,5) and a plurality of printed pages (7), a graphics tablet including a coordinate array (2) of rows (31) and columns (30) of conductors formed as part of said book (1), processing means (11) to which said coordinate array (2) is connected, speech storage means (27) responsive to said processing means (11) for storing speech relating to different areas of the pages (7) of said book (1), and speech reproduction means (28) for reproducing speech stored in said speech storage means (27), in which said coordinate array (2) is formed as an integral part of both the front cover (3) and back cover (5) of said book (1), in which said coordinate array (2) comprises a plurality of spaced apart first conductors (31) which extend generally across the width of both the front and back covers (3,5) of said book (1), and a plurality of spaced apart second conductors (30) which extend generally from top to bottom of the front and back covers (3,5) of said book (1), some of the second conductors (30) of said front cover (3) being connected to corresponding second conductors (30) of said back cover (5), and in which an electronic pointer (12) is provided connected to said processing means (11) for pointing to different areas of the pages (7) of said book (1) when said book (1) is open, and page detection means (38) is provided operable in conjunction with said electronic pointer (12) for determining whether a left side page or a right side page of said book (1) is being pointed at, said electronic pointer (12) being operable in conjunction with said coordinate array (2) for detecting through said pages (7) the area of the open book (1) to which said electronic pointer (12) is directed for causing the speech reproduction means (28) to reproduce speech corresponding to the area of the open page (7) of said book (1) to which said electronic pointer (12) is directed.

2. A system as claimed in claim 1, in which said coordinate array (2) is formed as an integral part of a fixed cover (3,5) of said book.

3. A system as claimed in claim 1, in which said coordinate array (2) is formed as an integral part of a loose cover of said book.

4. A system as claimed in claim 1, in which said coordinate array (2) is provided with connector means (8,9) for connecting said array (2) to said processing means (11).

5. A system as claimed in claim 4, in which said connector means (31,30) comprises a tape connector.

6. A system as claimed in claim 5, in which said tape connector is adhesively attached to terminal portions of said first and second conductors (31,30).

7. A system as claimed in claim 1, in which said first and second conductors (31,30) are provided on opposite sides of a flexible non-conductive sheet (33) which is embodied into the cover (3,5) of said book (1).

8. A system as claimed in claim 1, in which said electronic pointer (12) is connected to said processing means (11) by wire (13).

9. A system as claimed in claim 1, in which said electronic pointer (12) is remotely connected to said processing means (11).

10. A system as claimed in claim 1, in which said page detection means (38) comprises a pair of said second conductors (38) disposed on said front cover (3) of said book (1) and a pair of said second conductors (38) disposed on said back cover (5) of said book (1).

* * * * *

UNITED STATES PATENT AND TRADEMARK OFFICE
CERTIFICATE OF CORRECTION

PATENT NO. : 5,868,581
DATED : February 9, 1999
INVENTOR(S) : Reginald Alfred King, et al.

It is certified that error appears in the above-identified patent and that said Letters Patent is hereby corrected as shown below:

The title page showing the illustrative figure should be deleted to be replaced with the attached title page.

Drawing sheets, consisting of Figs. 1-5, should be deleted to be replaced with the Drawing Sheets, consisting of Figs. 1-5, as shown on the attached page.

Signed and Sealed this

Seventeenth Day of August, 1999

Attest:

Q. TODD DICKINSON

*Attesting Officer*      *Acting Commissioner of Patents and Trademarks*

United States Patent [19]

King et al.

[11] Patent Number: 5,868,581
[45] Date of Patent: Feb. 9, 1999

[54] DOCUMENT INTERPRETING SYSTEMS

[75] Inventors: Reginald Alfred King, Shrivenham; Hrand Mami Mamigonians, London, both of United Kingdom

[73] Assignee: Scanna Technology Limited, London, England

[21] Appl. No.: 635,936
[22] PCT Filed: Oct. 26, 1994
[86] PCT No.: PCT/GB94/02356
  § 371 Date: Jul. 9, 1996
  § 102(e) Date: Jul. 9, 1996
[87] PCT Pub. No.: WO95/12187
  PCT Pub. Date: May 4, 1995

[30] Foreign Application Priority Data

Oct. 26, 1993 [GB] United Kingdom .................... 9322042

[51] Int. Cl.⁶ .................................................. G09B 5/00
[52] U.S. Cl. ........................ 434/317; 434/169; 434/185; 200/5 A; 200/512; 462/55; 281/15.1
[58] Field of Search ............................... 434/156–159, 434/169, 178, 185, 201, 259, 307 R, 308, 317, 322–327, 334, 337, 339, 350, 362, 365; 341/34; 345/173, 174, 179; 178/18, 19; 200/5 A, 512; 462/17, 55; 273/236–239, 272; 84/470 R, 483.1, 678; 281/15.1

[56] References Cited

U.S. PATENT DOCUMENTS

| | | | |
|---|---|---|---|
| 3,376,778 | 4/1968 | Musser | 84/483.1 |
| 3,522,665 | 8/1970 | Kalt | 434/317 X |
| 3,562,394 | 2/1971 | Kiepe | 84/470 R X |
| 4,448,837 | 5/1984 | Ukeda et al. | |
| 4,664,634 | 5/1987 | Cutler et al. | |
| 4,697,048 | 9/1987 | Clements et al. | |
| 4,802,092 | 1/1989 | Harte | |
| 4,809,246 | 2/1989 | Jeng | |

(List continued on next page.)

FOREIGN PATENT DOCUMENTS

| | | |
|---|---|---|
| 0 383 304 | 8/1990 | European Pat. Off. |
| 2115587 | 9/1983 | United Kingdom |
| 2132359 | 7/1984 | United Kingdom |
| WO84/02995 | 8/1984 | WIPO |
| WO87/06752 | 11/1987 | WIPO |
| WO90/15402 | 12/1990 | WIPO |
| WO91/07715 | 5/1991 | WIPO |
| WO92/18964 | 10/1992 | WIPO |
| WO93/17764 | 9/1993 | WIPO |

OTHER PUBLICATIONS

Davis, M.R. et al, "The Rand Tablet: A Man–Machine Graphical Communication Device", Fall Joint Computer Conference, 1964 pp. 325–331.

Teixeira, J.F., et al, "The Sylvania data tablet: A new approach to graphic data input", Spring Joint Computer Conference, 1968, pp. 315–321.

Brenner, A.E. et al, "A Sonic Pen: A Digital Stylus System", IEEE Transactions on Computers, Jun. 1970, pp. 546–548.

Newman, W. et al, "Principles of Interactive Computer Graphics", McGraw–Hill Book Company, pp. 177–180 and 447.

Stavely, D.J., "A High-Quality, Low-Cost Graphics Tablet", Hewlett–Packard Journal, Jan. 1981, pp. 15–23.

Mamigonians, H.M., "Man–Machine Interface Systems for Industrial Robots", Ph.D. thesis, University College London, Jun. 1981, pp. 82–109, 288–298 and 300–301.

*Primary Examiner*—Joe H. Cheng
*Attorney, Agent, or Firm*—Jacobson, Price, Holman & Stern, PLLC

[57] ABSTRACT

A document interpreting system comprises a book having the co-ordinate array of a graphics tablet embodied in it, conveniently in the front cover and rear cover thereof, an electronics module comprising a microcontroller connected to the co-ordinate array, a pointer for pointing to arbitrary areas on an open page of the book, and a speech circuit for causing speech or other sounds to be emitted corresponding to the area of the page which is being pointed to.

10 Claims, 2 Drawing Sheets

UNITED STATES PATENT AND TRADEMARK OFFICE
CERTIFICATE OF CORRECTION

PATENT NO. : 5,868,581  
DATED : February 9, 1999  
INVENTOR(S) : Reginald Alfred King, et al It is certified that error appears in the above-indentified patent and that said Letters Patent is hereby corrected as shown below:

The title page showing the illustrative figure should be deleted to be replaced with the attached title page.

Drawing sheets, consisting of Figs. 1-5, should be deleted to be replaced with the Drawing Sheets consisting of Figs. 1-5, as shown on the attached page.

Signed and Sealed this

Thirteenth Day of March, 2001

*Attest:*

NICHOLAS P. GODICI

*Attesting Officer*   *Acting Director of the United States Patent and Trademark Office*

United States Patent [19]
King et al.

[11] Patent Number: 5,868,581
[45] Date of Patent: Feb. 9, 1999

[54] DOCUMENT INTERPRETING SYSTEMS

[75] Inventors: Reginald Alfred King, Shrivenham; Hrand Mami Mamigonians, London, both of United Kingdom

[73] Assignee: Scanna Technology Limited, London, England

[21] Appl. No.: 635,936

[22] PCT Filed: Oct. 26, 1994

[86] PCT No.: PCT/GB94/02356

§ 371 Date: Jul. 9, 1996

§ 102(e) Date: Jul. 9, 1996

[87] PCT Pub. No.: WO95/12187

PCT Pub. Date: May 4, 1995

[30] Foreign Application Priority Data

Oct. 26, 1993 [GB] United Kingdom ............... 9322042

[51] Int. Cl.$^6$ ........................................ G09B 5/00
[52] U.S. Cl. ........................ 434/317; 434/169; 434/185; 200/5 A; 200/512; 462/55; 281/15.1
[58] Field of Search ........................ 434/156–159, 434/169, 178, 185, 201, 259, 307 R, 308, 317, 322–327, 334, 337, 339, 350, 362, 365; 341/34; 345/173, 174, 179; 178/18, 19; 200/5 A, 512; 462/17, 55; 273/236–239, 272; 84/470 R, 483.1, 678; 281/15.1

[56] References Cited

U.S. PATENT DOCUMENTS

| 3,376,778 | 4/1968 | Musser ................................ 84/483.1 |
| 3,522,665 | 8/1970 | Kalt ................................ 434/317 X |
| 3,562,394 | 2/1971 | Kiepe ................................ 84/470 R X |
| 4,448,837 | 5/1984 | Ikeda et al. . |
| 4,664,634 | 5/1987 | Cutler et al. . |
| 4,697,048 | 9/1987 | Clements et al. . |
| 4,802,092 | 1/1989 | Harte . |
| 4,809,246 | 2/1989 | Jeng . |

(List continued on next page.)

FOREIGN PATENT DOCUMENTS

| 0 383 304 | 8/1990 | European Pat. Off. |
| 2115587 | 9/1983 | United Kingdom . |
| 2132359 | 7/1984 | United Kingdom . |
| WO84/02995 | 8/1984 | WIPO . |
| WO87/06752 | 11/1987 | WIPO . |
| WO90/15402 | 12/1990 | WIPO . |
| WO91/07715 | 5/1991 | WIPO . |
| WO92/18964 | 10/1992 | WIPO . |
| WO93/17764 | 9/1993 | WIPO . |

OTHER PUBLICATIONS

Davis, M.R. et al, "The Rand Tablet: A Man–Machine Graphical Communication Device", Fall Joint Computer Conference, 1964 pp. 325–331.

Teixeira, J.F., et al, "The Sylvania data tablet: A new approach to graphic data input", Spring Joint Computer Conference, 1968, pp. 315–321.

Brenner, A.E. et al, "A Sonic Pen: A Digital Stylus System", IEEE Transactions on Computers, Jun. 1970, pp. 546–548.

Newman, W. et al, "Principles of Interactive Computer Graphics", McGraw–Hill Book Company, pp. 177–180 and 447.

Stavely, D.J., "A High–Quality, Low–Cost Graphics Tablet", Hewlett–Packard Journal, Jan. 1981, pp. 15–23.

Mamigonians, H.M., "Man–Machine Interface Systems for Industrial Robots", Ph.D. thesis, University College London, Jun. 1981, pp. 82–109, 288–298 and 300–301.

*Primary Examiner*—Joe H. Cheng
*Attorney, Agent, or Firm*—Jacobson, Price, Holman & Stern, PLLC

[57] ABSTRACT

A document interpreting system comprises a book having the co-ordinate array of a graphics tablet embodied in it, conveniently in the front cover and rear cover thereof, an electronics module comprising a microcontroller connected to the co-ordinate array, a pointer for pointing to arbitrary areas on an open page of the book, and a speech circuit for causing speech or other sounds to be emitted corresponding to the area of the page which is being pointed to.

10 Claims, 2 Drawing Sheets